(12) United States Patent
Marioni

(10) Patent No.: US 6,675,647 B2
(45) Date of Patent: Jan. 13, 2004

(54) DEVICE FOR SENSING THE LEVEL OF LIQUID, PARTICULARLY FOR SUBMERSED PUMPS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 0 days.

(21) Appl. No.: 10/292,463

(22) Filed: Nov. 13, 2002

(65) Prior Publication Data
US 2003/0094043 A1 May 22, 2003

(30) Foreign Application Priority Data
Nov. 20, 2001 (IT) ........................................ 2001A00269

(51) Int. Cl.$^7$ .............................................. G01F 23/26
(52) U.S. Cl. .......................................................... 73/304
(58) Field of Search ........................ 73/304 C; 340/621

(56) References Cited

U.S. PATENT DOCUMENTS

| | | | | |
|---|---|---|---|---|
| 4,987,776 A | * | 1/1991 | Koon | 73/304 C |
| 5,747,689 A | * | 5/1998 | Hampo et al. | 73/304 C |
| 5,856,783 A | * | 1/1999 | Gibb | 340/618 |
| 6,293,145 B1 | * | 9/2001 | Wallrafen | 73/304 C |

* cited by examiner

Primary Examiner—Hezron Williams
Assistant Examiner—Katina Wilson
(74) Attorney, Agent, or Firm—Akerman Senterfitt

(57) ABSTRACT

A device for sensing the level of liquid, particularly for submersed pumps, comprising capacitors with two plates arranged one above the other, wherein the plates are arranged in vertical succession at different levels.

6 Claims, 2 Drawing Sheets

DEVICE FOR SENSING THE LEVEL OF LIQUID, PARTICULARLY FOR SUBMERSED PUMPS

BACKGROUND OF THE INVENTION

The present invention relates to an improved device for sensing the level of liquid, particularly for submersed pumps.

As is known, submersed pumps are applied most frequently in evacuating traps or the like, to remove an excessive quantity of liquids gradually accumulated therein.

A typical case is the emptying of drainage traps and of water accumulated in excavations in building yards.

Submersed pumps usually have devices for sensing the level of liquid that allow actuation when the level of the liquid exceeds a maximum value and stop operation if the level of liquid reaches a minimum value.

These known sensing devices are substantially constituted by appendages that protrude outside the dimensions of the pump with end floats which, by being affected by the rise or fall of the level of liquid, activate electrical connections.

Since they protrude outside the overall dimensions of the pumps, known sensing devices require the traps or spaces from which the liquid is to be evacuated to be larger than such overall dimensions of the pump.

Moreover, the correct operation of these devices depends also on whether floating objects are present or not within the liquid.

The presence of a floating foreign object might in fact alter the readings of the device or even damage it.

Sometimes the readings of the devices can also be biased as a consequence of a turbulent motion of the liquid.

To solve these drawbacks, a sensing device has been devised which is the subject of U.S. patent application Ser. No. 09/959,343 in the name of this same Applicant and comprises means for sensing the variation in the electrical and/or magnetic field in relation to the variation of the level of the liquid.

An embodiment of these sensing means is constituted by two pairs of plates, arranged one above the other, at a pipe in which the liquid is present.

The plates arranged in an upward region signal that the upper level of the liquid has been reached to a control unit, which switches on the pump.

The plates arranged in a downward region instead signal when it is timely to stop the pump.

To detect the variation in the capacitance of the capacitors that produces the level signal, the method of measuring their charging time is used.

The capacitance of each capacitor varies considerably when water or air is present as dielectric between the plates (the difference is approximately two orders of magnitude), and the charging time is affected thereby importantly, although the capacitances to be measured are small in absolute terms.

FIG. 1 of the accompanying drawings plots the charging and discharging time of a capacitor.

The dashed line relates to the capacitor with air as the dielectric, while the solid line relates to water as the dielectric.

The considerable difference between the charging times $t_1$ and $t_2$ and the discharging times $t_3$ and $t_4$ is evident.

Electronics currently provides very fast logic units or microcontrollers, and the measurement is performed easily.

Twin-capacitor devices provide a series of advantages:

two distinct and clearly identified capacitances are measured in order to check the maximum and minimum levels, because all metallic plates are used and no parasitic capacitors that would introduce uncertainties are used;

the sensing of the variation in the capacitance according to the charging and/or discharging time does not depend on environmental factors but on a basic principle of physics, the capacitances vary to an important extent, and it is necessary to distinguish only two values per sensor (water or air), digitizing the signal;

with digital circuitry there is no drift due to analog components.

Practical execution nonetheless has revealed drawbacks, in particular the need to provide recesses, irregular shapes, insertion of pipes, in order to avoid problems due to dirt, floating bodies, vortical motions and clogging.

SUMMARY OF THE INVENTION

The aim of the present invention is to further improve devices for sensing the level of liquid based on capacitors by eliminating the problems of known types noted above.

Within this aim, an object of the invention is to provide a device for sensing the level of liquid whose sensing cannot be influenced by any turbulent motions of the liquid or by the presence of foreign objects floating within said liquid.

Another object is to provide a sensing device that is contained within the dimensions of the pump.

Another object is to be able to provide pumps that are more compact than current ones.

Another object is to provide a device that gives advantages in terms of production both to the pump and to the control and actuation circuits.

This aim and these and other objects that will become better apparent hereinafter are achieved by an improved device for sensing the level of liquid, particularly for submersed pumps, of the type that comprises capacitors with two plates arranged one above the other, characterized in that said plates are arranged in vertical succession at different levels.

Advantageously, said capacitors are two and are formed by three plates arranged vertically on three different levels, the intermediate plate being shared by the two capacitors and being connected to the ground.

BRIEF DESCRIPTION OF THE DRAWINGS

Further characteristics and advantages will become better apparent from the description of a preferred but not exclusive embodiment of the invention, illustrated only by way of non-limitative example in the accompanying drawings and figures, wherein.

DESCRIPTION OF THE PREFERRED EMBODIMENTS

Figure 1:
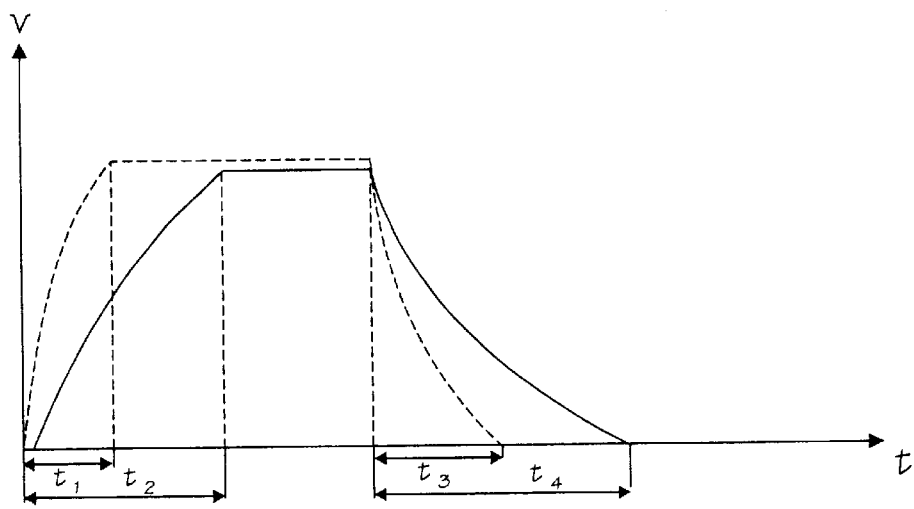
FIG. 1 plots the charging and discharging times of a capacitor in which the dielectric is constituted by air and by water.
Figure 2:
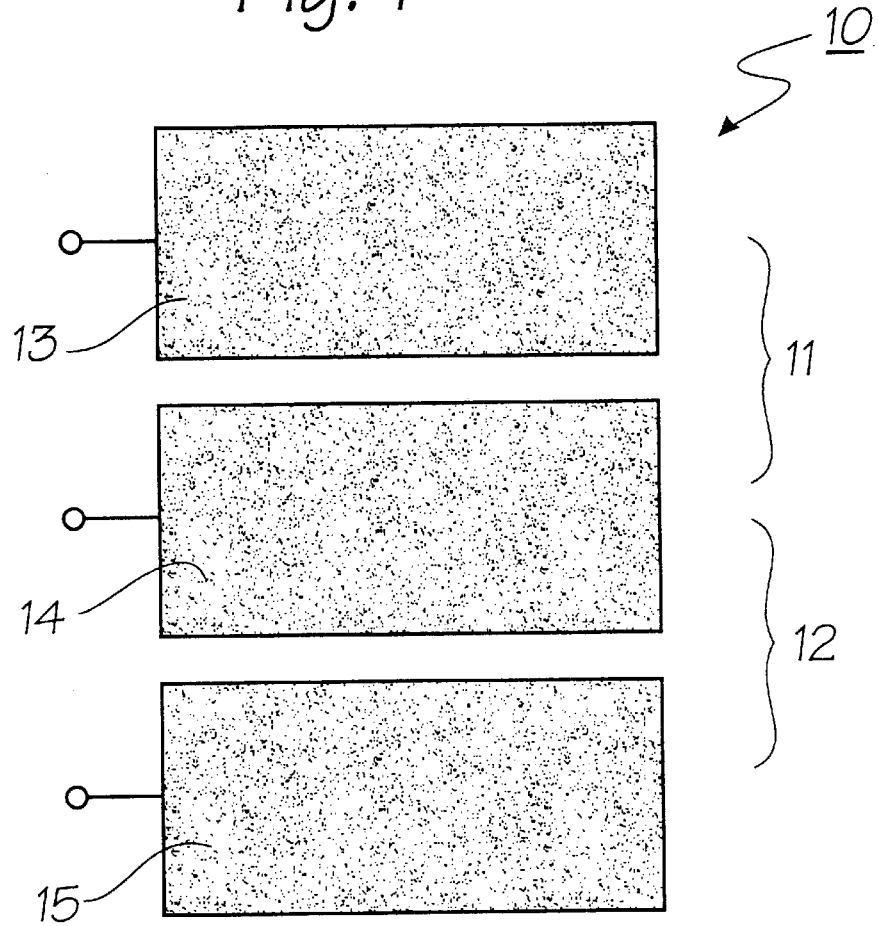
FIG. 2 is a schematic side view of a device according to the invention.
Figure 3:
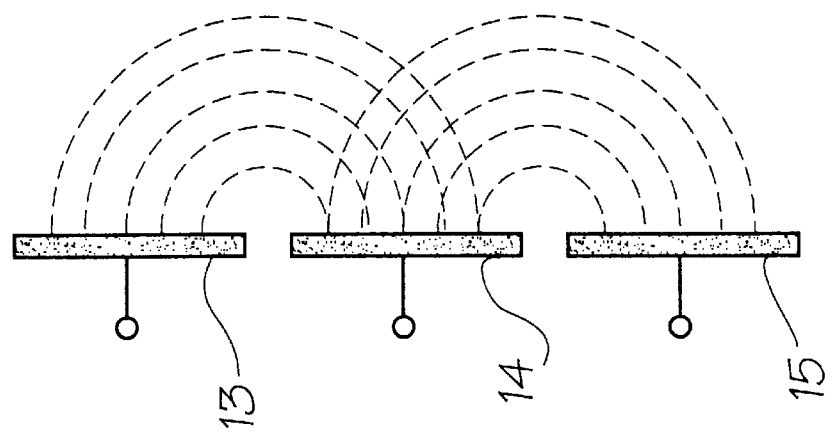
FIG. 3 is a schematic front view of a device according to the invention.

With particular reference to FIGS. 2 and 3, a device for sensing the level of liquid according to the invention is generally designated by the reference numeral 10.

The device 10 comprises two capacitors, of the type with two plates, which are arranged one above the other and are designated by the reference numerals 11 and 12 respectively; said capacitors are formed by three flat and co-planar plates arranged in vertical succession at three different levels, and are designated respectively by the reference numerals 13, 14 and 15.

According to the invention, one of the plates, particularly the intermediate plate 14, is shared by the two capacitors 11 and 12 and is connected to the ground.

The plate that is connected to the ground can also be conveniently split.

Figure 4:
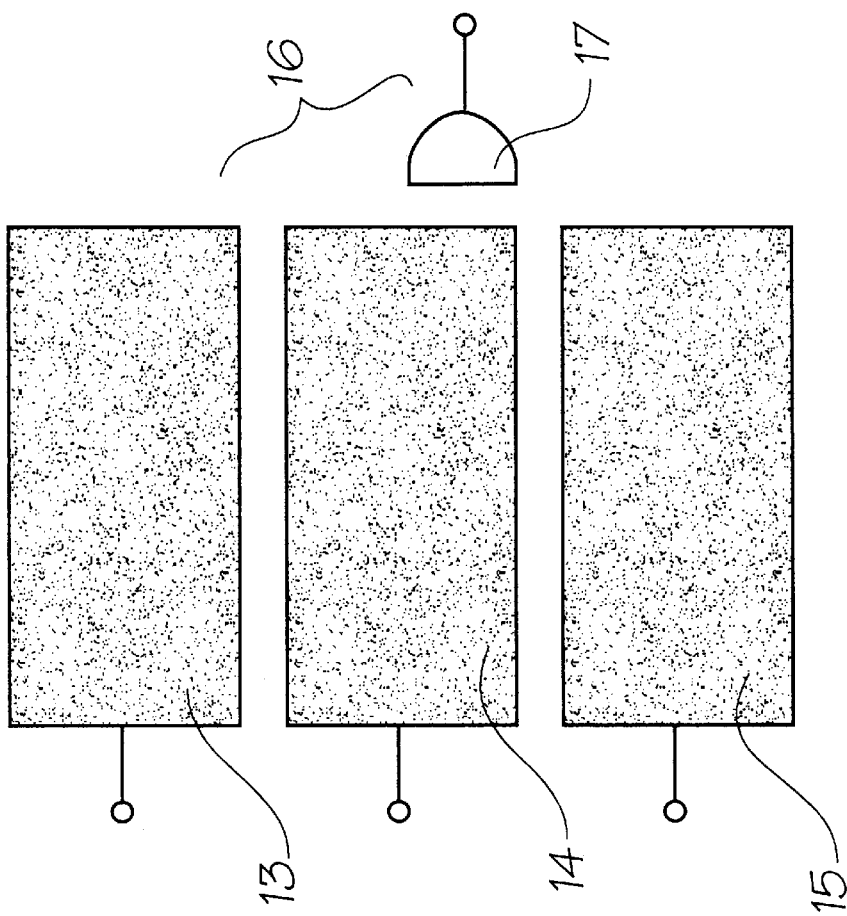
FIG. 4 is a schematic front view of a device according to the invention in a different embodiment.

With particular reference to FIG. 4, advantageously it is possible to provide at least one third capacitor 16 by arranging alongside the intermediate plate 14 at least one fourth plate 17 in order to sense another variation in capacitance and identify two levels (0 or 1), but in this case in order to check for the presence or absence (capacitance with air as dielectric) of a human finger.

The fourth plate 17 must be conveniently flat and co-planar to the preceding ones.

In this case, therefore, at least one button is provided for controlling the operation of the pump independently of the state of the other two capacitors.

A typical case can be the particular and manual use of the pump, which currently is possible only by lifting manually the float that controls pump power-on or shutdown.

The capacitors are connected to a control board, not shown in the figures, which uses logic units or microprocessors to control the motor of the pump, and it is possible to insert protections, such as a block against rotation in the absence of water after a programmable time, in order to protect the hydraulic system, the motor and the mechanical components of said pump.

In practice, it has been found that the present invention has achieved the intended aim and objects.

In particular, a device has been provided which does not have external movable appendages and does not require the provision of recesses, irregular shapes, insertion of pipes, to avoid problems due to dirt, floating objects, vortical motions and clogging.

The three plates can in fact be included and encapsulated in the pump casing or container itself, allowing to provide said pump in a more compact form than currently provided.

Furthermore, the fact that the plates are on the same plane allows to produce them by using materials and methods that are used for printed circuits, with consequent advantages in terms of production process for providing the assembly constituted by the sensors, the pump, and the connections to the control and actuation circuit.

The present invention is susceptible of numerous modifications and variations, all of which are within the scope of the appended claims.

All the details may be replaced with other technically equivalent elements.

In practice, the materials used, as well as the dimensions, so long as they are compatible with the contingent use, may be any according to requirements.

The disclosures in Italian Patent Application No. PD2001A000269 from which this application claims priority are incorporated herein by reference.

What is claimed is:

1. A device for sensing a level of a liquid in a submersed pump, comprising two capacitors formed by three metal plates, wherein said plates are co-planar and arranged in vertical succession at respectively different levels, said plates being included and encapsulated in a casing or container of a pump.

2. The device of claim 1, wherein at least one plate is shared by said two capacitors.

3. The device of claim 2, wherein said shared plate is an intermediate plate.

4. The device of claim 2, wherein said three plates are flat.

5. The device of claim 2, comprising at least one third capacitor, provided by arranging at least one fourth plate laterally to said shared intermediate plate.

6. The device of claim 5, wherein said fourth plate is flat and co-planar to the preceding ones.

\* \* \* \* \*